US009875561B2

(12) United States Patent
Mohr et al.

(10) Patent No.: US 9,875,561 B2
(45) Date of Patent: Jan. 23, 2018

(54) METHOD AND SYSTEM FOR DYNAMICALLY CREATING AND EXPLORING GRAPH STRUCTURES

(71) Applicants: Jeffrey C. Mohr, Menlo Park, CA (US); Michael R. Mohr, Honolulu, HI (US)

(72) Inventors: Jeffrey C. Mohr, Menlo Park, CA (US); Michael R. Mohr, Honolulu, HI (US)

(*) Notice: Subject to any disclaimer, the term of this patent is extended or adjusted under 35 U.S.C. 154(b) by 35 days.

(21) Appl. No.: 14/717,493

(22) Filed: May 20, 2015

(65) Prior Publication Data

US 2015/0339835 A1 Nov. 26, 2015

Related U.S. Application Data

(60) Provisional application No. 62/000,811, filed on May 20, 2014.

(51) Int. Cl.
*G06T 11/20* (2006.01)
*G06F 17/30* (2006.01)

(52) U.S. Cl.
CPC ...... *G06T 11/206* (2013.01); *G06F 17/30958* (2013.01)

(58) Field of Classification Search
CPC .......................... G06T 11/206; G06F 17/30958
See application file for complete search history.

(56) References Cited

U.S. PATENT DOCUMENTS

| 2006/0143205 | A1* | 6/2006 | Fuchs | G06F 17/30091 |
| 2012/0131047 | A1* | 5/2012 | Rajaraman | G06F 17/30592 707/769 |
| 2014/0040300 | A1* | 2/2014 | Narayanan | G06F 17/30958 707/758 |
| 2014/0172826 | A1* | 6/2014 | Hoffmann | G06F 17/30572 707/722 |

OTHER PUBLICATIONS

Smith et al., "Analyzing (Social Media) Networks with NodeXL", C & T'09, Jun. 25-27, 2009, University Park, Pennsylvania, USA, ACM 978-1-60558-601-4/09/06.*

* cited by examiner

*Primary Examiner* — Maurice L McDowell, Jr.
(74) *Attorney, Agent, or Firm* — Tysver Beck Evans, PLLC

(57) ABSTRACT

A system and method are presented that store graph data in a database as nodes, edges that link nodes, and profiles that contain properties that provide additional context for the nodes and edges. Computerized methods are described that provide for the dynamic creation of graph data based on the properties stored on the profiles related to each node, including the ability to predetermine which properties are used within a CSS-like language. Methods for visually focusing on a portion of a graph are also disclosed that allow a user to select one or more base nodes and limit the display of related nodes to those nodes within a defined degree of separation from the base node(s). The user can control the desired degree of separation, can select multiple base nodes, and can predetermine the base nodes to be used (and desired degree of separation for each) using a CSS-like language.

13 Claims, 12 Drawing Sheets

METHOD AND SYSTEM FOR DYNAMICALLY CREATING AND EXPLORING GRAPH STRUCTURES

FIELD OF THE INVENTION

This invention relates generally to systems and methods for analyzing and visualizing data. More particularly, it relates to methods for dynamically creating graph structures, manipulating the behavior and visual appearance of the graph, and decoupling meta-data from the underlying graph structure.

BACKGROUND OF THE INVENTION

Graphs are the topological structures used to model relationships between objects. A graph is made up of connected elements, with each element being referred to as a node in the graph. The nodes are connected with lines called edges. Nodes that are connected together via an edge without any intermediate nodes are considered "adjacent nodes." Attributes or properties can be defined for the individual nodes and edges within a graph. Graphs can be used to model many types of relationships and processes and are often used in physical, biology, social and information systems, strategic planning, and other related fields.

SUMMARY

Various aspects of the present invention provide systems and methods for analyzing and visualizing data. The described embodiments implement a method and system for creating a lightweight graph structure out of node property data utilizing detached profiles and style sheets.

One embodiment of the present invention detaches property data from the nodes and edges. Instead, this embodiment stores property data as separate profiles that can easily be attached to one or more nodes and edges. This embodiment is further able to store properties for higher-level abstractions within a graph, including loops, delays, groups, and labels.

In another embodiment, a computer-implemented method called "clustering" is provided that creates a graph structure out of property data for the selected nodes. In the preferred embodiment, this property data is stored in a detached profile. The method comprises the steps of selecting target nodes, picking the properties to use, retrieving the values for the selected properties for each target node, creating lightweight nodes for each unique property value, creating edges between those lightweight nodes and the nodes with matching values, and optionally saving the lightweight nodes and edges. The user can predefine the attributes to use for clustering and override the type assigned to the lightweight nodes and edges using a CSS-like language called perspectives.

In another embodiment, a computer-implemented method called "focusing" is provided for exploring portions of the graph as defined by one or more base nodes each with a specified value for the number of degrees out for inclusion. The method comprises the steps of selecting which node to use as a base node, indicating a desired number of degrees of separation, hiding the nodes beyond the specified number of degrees of separation, and optionally defining additional base nodes and degrees of separation. The user can predefine the base nodes to be used (and desired degree of separation for each) using a CSS-like language called perspectives. Edges, loops, and other graph objects can optionally be used to select the base nodes.

In another embodiment, a computer-implemented method called "perspectives" is provided for a language that allows for defining the visual appearance and behavior of nodes, edges, and other graph objects. The method comprises the steps of defining a selector to identify which graph objects should be affected (or alternatively using an @settings selector to affect global graph settings) and defining the properties and corresponding property values that should affect the graph objects identified by the selector. In the preferred embodiment, the selector searches the graph structure and the data stored in the detached profiles to select the related nodes, edges, and other graph objects linked to those profiles.

DETAILED DESCRIPTION

Profiles

Figure 1:
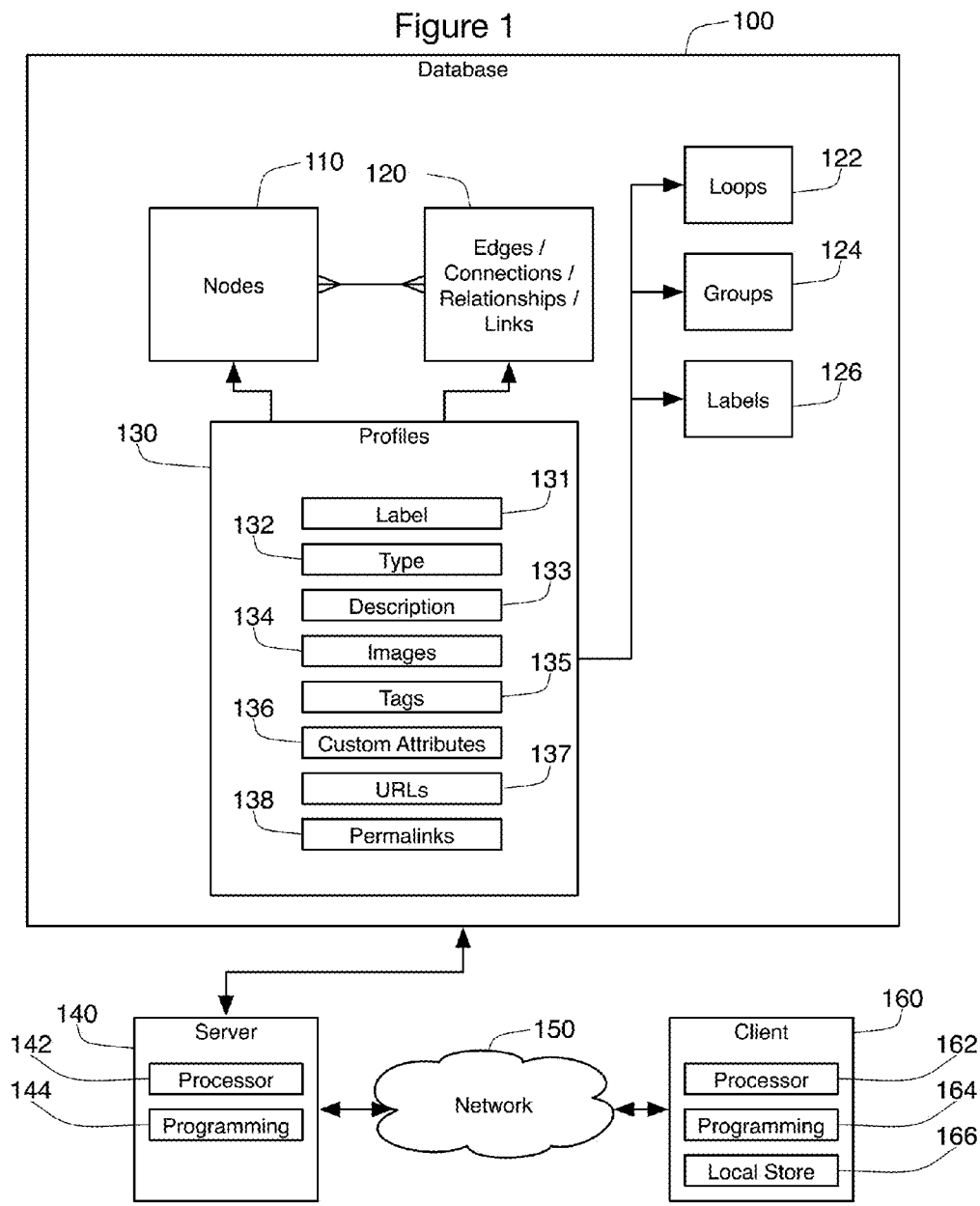
FIG. 1 is a schematic view of a system for implementing one embodiment of the present invention.

As shown in FIG. 1, a server computer 140 is able to provide access to information stored in a database 100 over a network 150 to a client computer 160. The computers 140, 160 use network interfaces (not shown) to communicate with each other over network 150. In the preferred embodiment, the network 150 is a wide area network (WAN) such as the Internet. The network interfaces for the computers 140, 160 may connect directly to the WAN 150, or can communicate with the network 150 by first connecting to a local wireless network that provides connection to network 150. The network interfaces may connect to the network 150 using one of the Institute of Electrical and Electronics Engineers' (IEEE) 802.11 standards (commonly known as WiFi). If the network 150 is based on TPC/IP, the data network interfaces will implement a TCP/IP protocol stack to manage the communications. Each of these computers 140, 160 further includes a processor 142, 162 that operates specific programming instructions 144, 164, respectively. The processors 142, 162 are preferably general purpose CPUs of the type provided by Intel Corporation or Advanced Micro Devices, Inc., operating under the control of a general purpose operating system such as Mac OS by Apple, Inc., Windows by Microsoft Corporation (Redmond, Wash.), or Linux (available from a variety of sources under open source licensing restrictions).

The server programming 144 allows the server 140 to receive requests for information from the client computer 160, to query a database 100 to obtain this information, and to provide this data to the client computer 160. The client programming 164 provides a user interface to the user. This user interface can be created by a standard web browser, essentially allowing the server computer 140 to provide graphics related programming in a web-based "software as a service" model. In these types of embodiments, the client programming 164 essentially provides a "thin client" to the user, and the majority of the processing and user interaction is handled by the server computer 140. In other embodiments, the client programming 164 is able provides a custom interface to the user and handles much of the processing locally (i.e., the client programming 164 provides a "thick client"). In still further embodiments, the client programming 164 maintains and manages a local store of information 166. This local store 166 may provide a cached or temporary copy of data stored in the database 100. Manipulations to the data from the database 100 can be temporarily stored in the local store 166 before either being discarded or saved through the server computer 140 in the database 100.

The data used to provide the user interface is stored in a database 100, which in the preferred embodiment contains information about both "nodes" 110 and links between those nodes called edges 120 (referred to as a "graph"). A graph can be represented as directed, undirected, or mutual graph of N nodes. In the preferred embodiment, each node 110 corresponds to a database entry in a database 100. A given node 110 has a set of edges (also known as links or connections) 120 that connect the node 110 to other nodes 110. A user views the contents of the database 100 through a "map." Each map is a visual display of some or all of the nodes 110, edges 120, and other graph objects (defined as loops 122, groups 124, and labels 126) that are contained in the database 100. In the preferred embodiments, subsets of data in the database 100 can be viewed through a plurality of maps, with each map defining data to be displayed and aspects of the user interface that is used to display this data. FIG. 1 does not show a "map" of the data in database 100, but merely shows the content of this data in a schematic form for a better understanding of the present invention.

In order for the nodes and edges to provide additional context, attributes or property values can be associated with the nodes 110 and/or edges 120. Traditionally the property data for a given node 110 or edge 120 is stored directly alongside the node 110 or edge 120 in the database. One embodiment of the present invention refrains from storing property data alongside the node 110 or edge 120. Instead, the embodiment creates separate profiles 130 that are pointed to by one or more nodes 110, edges 120 or other graph objects (these other objects can includes loops 122, groups 124, and label objects 126). This provides for the ability to attach profiles 130 to the contents of the graph, share profile data across graphs, and even have multiple "ghost" nodes pointing to the same underlying profile within a single map.

As shown in FIG. 1, each profile 130 includes a label 131, which functions as a name or label for the item, a type 132, which provides the type of the item involved, and a description 133, which provides a description for the item. Preferably, profiles 130 also include one or more images 134 and tags 135 that can be used to provide additional context. In addition, the preferred embodiments let users custom-define fields or attributes 136, which allows profiles to contain any data desired by the user. The methods described herein are not limited to just nodes and edges but also apply to loops, groups, delays, labels, and other graph entities and abstractions.

FIG. 1 also shows that the profile 130 includes standard URLs 137 and permalinks 138. Standard URLs 137 provide URLs that load the map with the given node 110, edge 120 or other graph object selected and are written in plain language style in that they include the name of the graph object within the URL. Permalinks 138 differ from standard URLs in that the URL is not updated based on changes to the label of the node, edge or other graph object since the link is created using a unique ID rather than including the name of the graph object. This allows for a permalink to continue to link to the same object even once the label has changed (whereas the standard URL would no longer point to the object once the label had changed).

Loops 122 consist of a collection of edges 120 or a collection of nodes 110 and related edges 120. A method was invented for creating loops 122 and defining data in a profile 130 for the loop 122. These loops 122 can be accessed via custom style sheets to change the appearance and behavior of the loops 122 and the related nodes 110 and edges 120. A user creates a loop 122 by specifying one or more nodes 110 or edges 120 that are part of the loop 122, clicking a button or entering a keystroke to create the loop 122, and then specifying a label 131 for the loop 122. This creates a detached profile 130 that can be used to save property data for the given loop 122.

Figure 2:
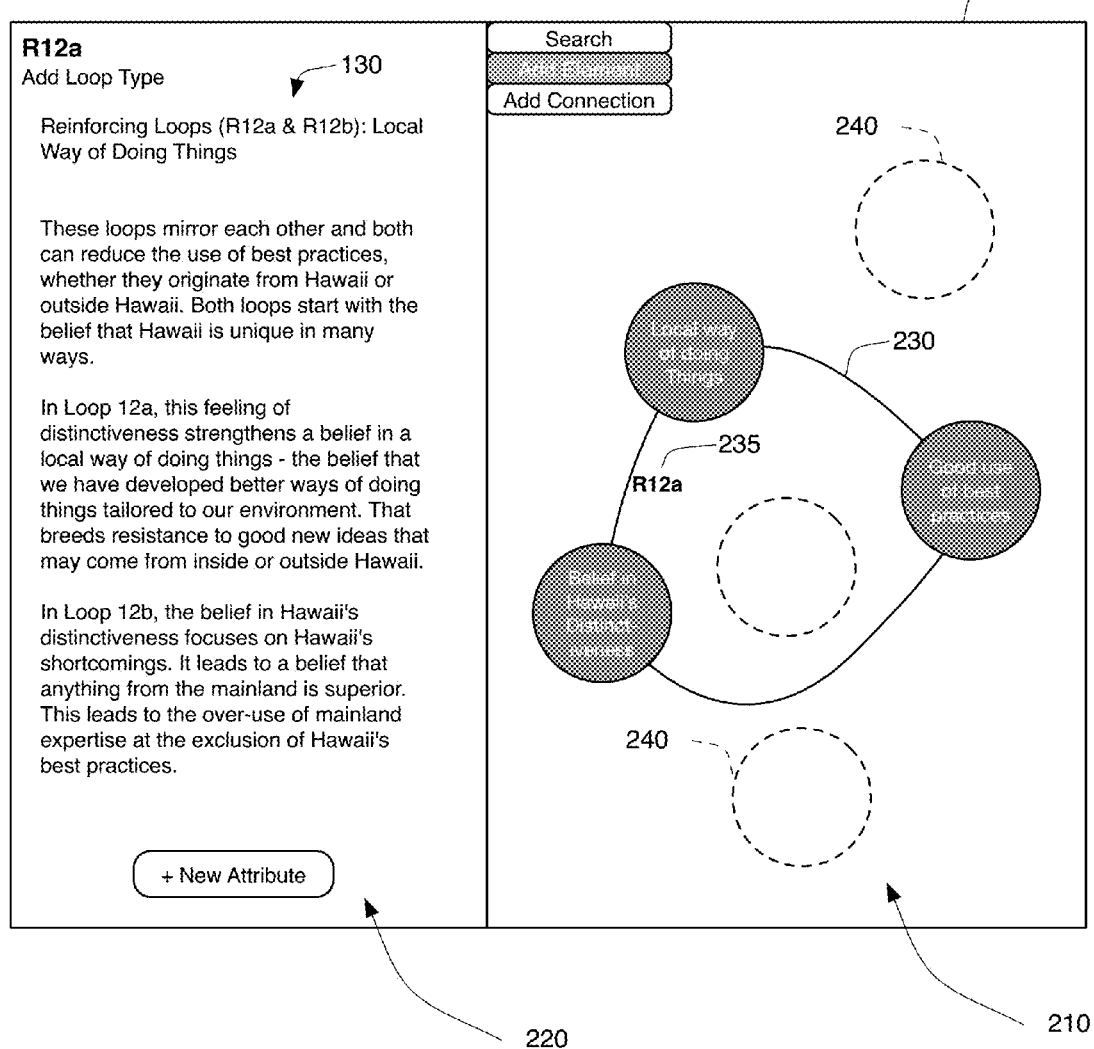
FIG. 2 is a screenshot of one embodiment of the present invention showing a loop.

FIG. 2 shows a sample screen shot 200 of one embodiment of the present invention showing a loop 122. The screen shot 200 shows a map 210 of the graph data on the right side of the screen 200, and information 220 about selected aspects of the graph data on the left side of the screen 200. The map 210 shown in FIG. 2 contains an example loop 230. The user can maneuver a pointer to hover over a displayed label 235 of the loop 230, which "showcases" the edges 120 and connected nodes 110 that are part of the loop 230 by muting the other parts 240 of the map that are not included in the loop 230. Clicking and holding on the displayed loop label 235 "focuses" the map 210 on the loop 230, which hides all other parts 240 of the map 210 completely. The loop 230 will continue to exist whether or not all of the edges 120 that form part of the loop 230 remain as part of the graph structure. In FIG. 2, the loop 230 includes three edges between three nodes ("Local way of doing things", "Good use of best practices", and "Belief in Hawaii's distinctiveness"). The profile 130 for the loop 230 is displayed in information area 220, and includes a narrative description of the loop 230 and can also include other properties (attribute values) as desired.

A group 124 is a specific collection of nodes 110 and edges 120. A group 124 is different than a loop 122, in that a loop 122 is usually a closed circle of edges 120 (traversing the edges 120 in a loop 122 will return to the beginning), while groups 124 of nodes 110 and edges 120 can take any configuration. Groups 124 can be created within a graph structure, whether by region, community, path, or other methods and then profiles 130 can be created and assigned to the group 124 as well. Groups 124 may be the result of transform operations (described below) and may include any number of nodes 110 and edges 120. The group profile 130 is a way to assign attributes and other data to the group 124 in addition to the profile data stored for each individual node 110 or edge 120 within the group 124.

The label graph object 126 provides a method for adding text to the map. By creating a new label graph object 126 just for text, that text object 126 can have a profile 130 to it that assigns attributes and other data to the label object 126. Label objects 126 do not include collections of any nodes or edges.

Clustering

One embodiment of the present invention generates a new graph structure by a process known as clustering. Clustering creates alternative topological views of the data using property data stored in the profiles 130 to create lightweight nodes and edges for a plurality of nodes 110. The newly generated graph structure can be maintained in a lightweight, temporary format that can easily be removed so that a user can quickly create and discard new maps for viewing the data. Alternatively, the newly generated graph structure can be converted to a heavyweight, permanent format by merging it into the existing graph structure. While the preferred embodiment uses the detached profiles 130 to cluster data, it is possible to perform the same method even if the property data is stored directly on the nodes of a graph. The clustering method also includes the ability to create the graph structure for only the active selection of nodes rather than the entire graph.

Figure 3:
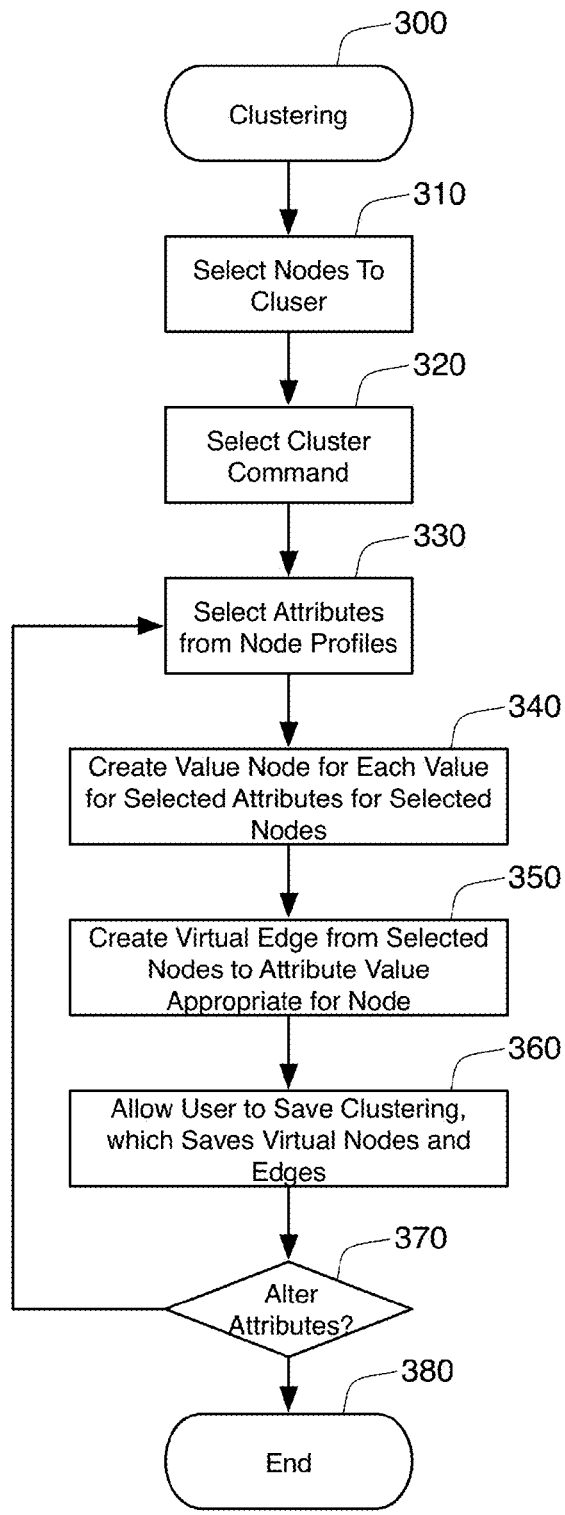
FIG. 3 is a flow chart showing a method for implementing clustering.
Figure 4:
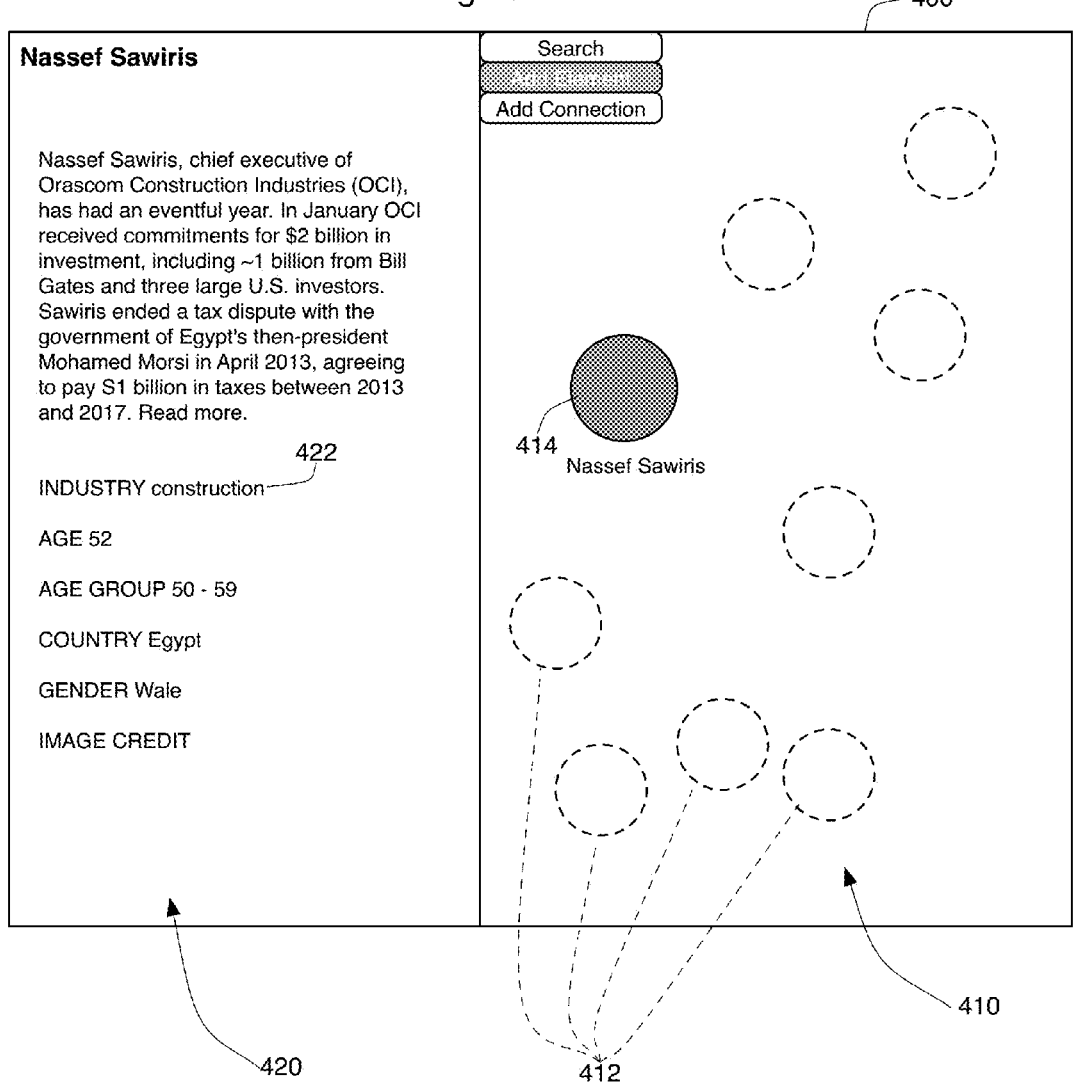
FIG. 4 is a screenshot of individual, unconnected nodes.
Figure 5:
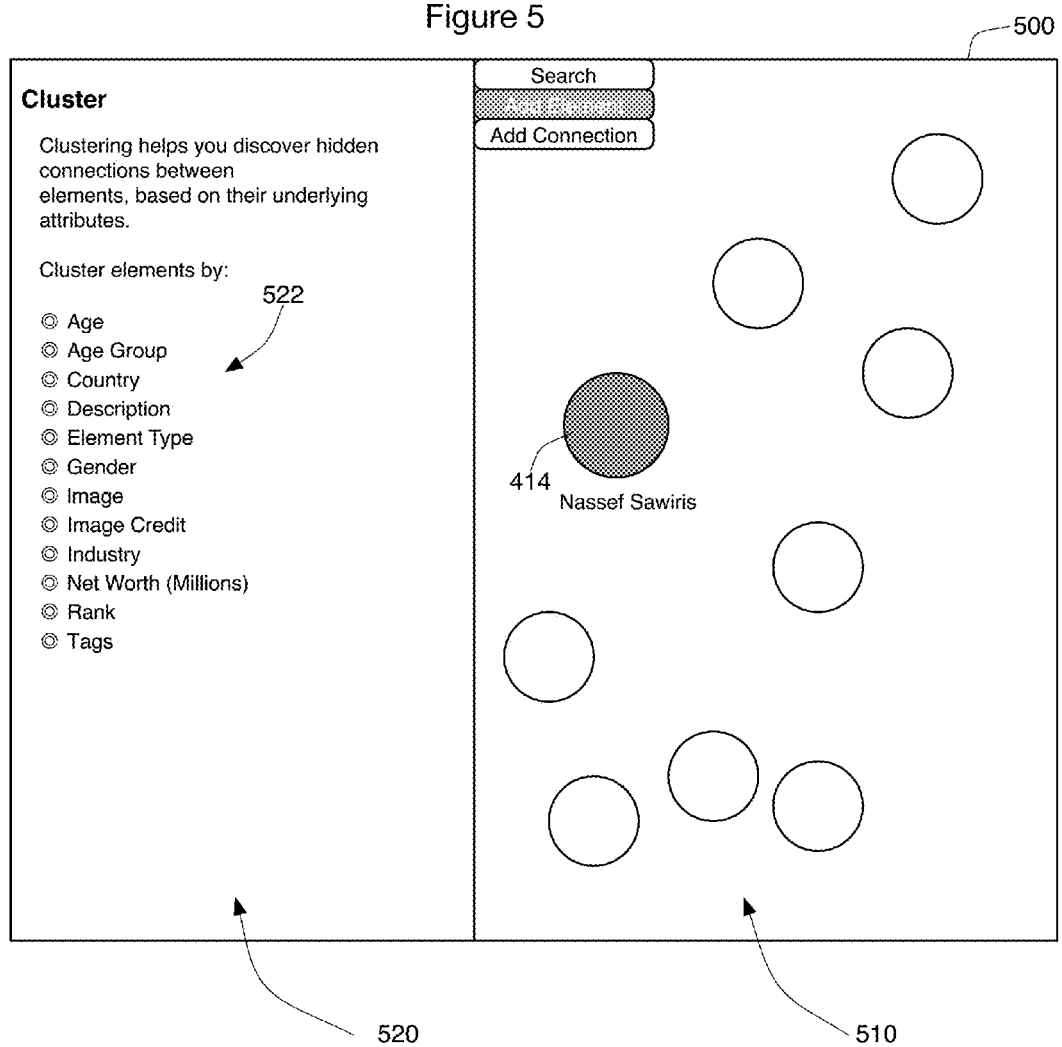
FIG. 5 is screenshot showing an interface for selecting an attribute for clustering.
Figure 6:
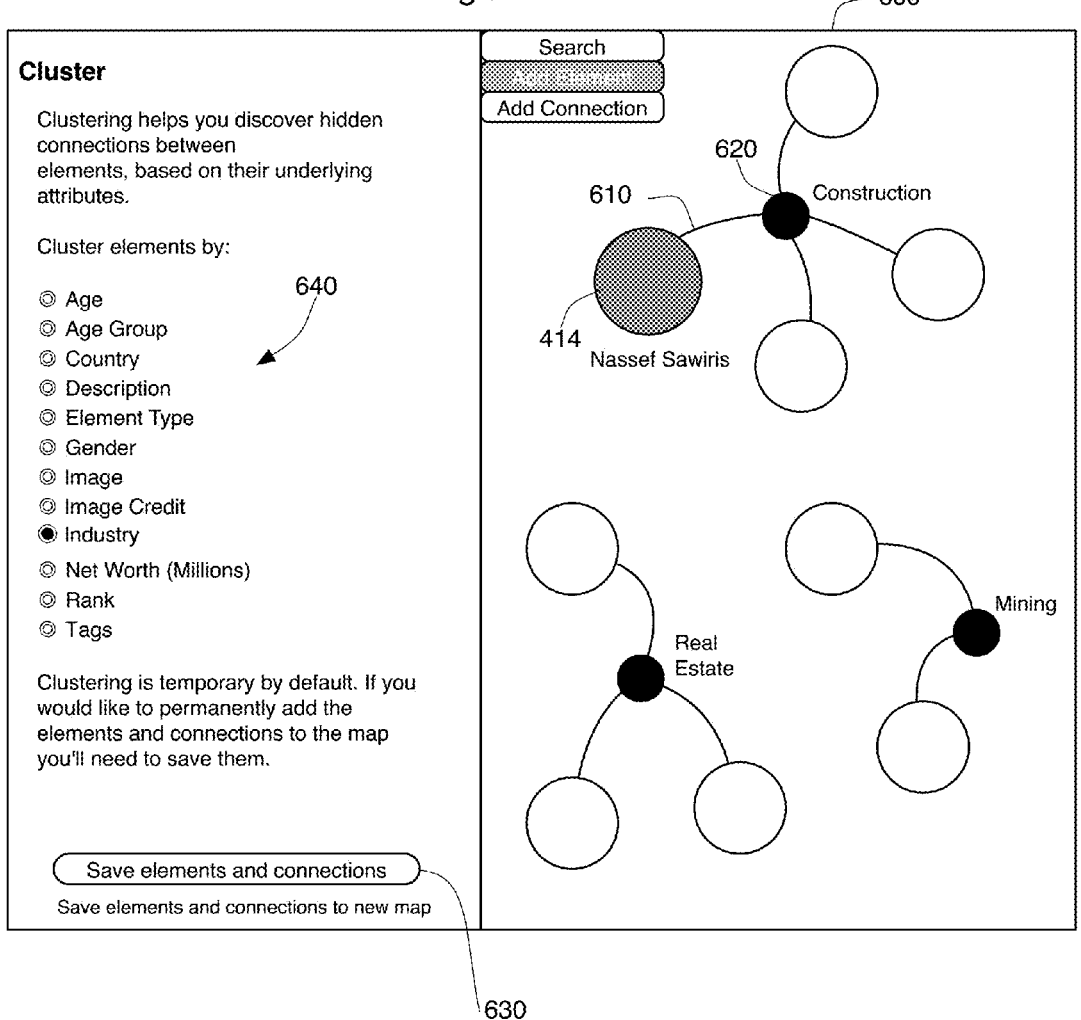
FIG. 6 is a screenshot of clustered nodes.

The clustering method 300 is shown in the flow chart of FIG. 3, and can be seen in the example shown in FIGS. 4, 5, and 6. The method 300 starts when a user selects one or more nodes from the database to be included in the clustering method 300. In one embodiment, the user selects the nodes through a graphical user interface. This can be seen in FIG. 4, which shows a screen shot 400 having a map 410 display of individual, unconnected nodes 412. As with other nodes 110 in the database, each node 412 displayed in the map 410 has a profile 130 that provides additional contextual information about the node 412. In the example shown in FIG. 4, a particular node 414 is temporarily selected. When it is selected, information from its profile 130 is shown in the left hand portion 420 of the screen. In this case, this data portion 420 shows information about an individual named Nassef Sawiris. The data 420 shown includes his age, his country citizenship, as well as a custom property 422 that defines the "Industry" the individual primarily works in. For this node 414 representing "Nassef Sawiris," the profile data 130 shows a value of "construction" for the "Industry" property at attribute 422. Using this interface 400, a user could manipulate a pointer or cursor to select multiple nodes 412, such as by drawing a box in the map 410 that intersects the desired nodes or by individually clicking on displayed nodes. In the preferred embodiment, a user could select all nodes 412 simply by ensuring that no individual nodes are selected.

The next step 320 is for the user to select the cluster command to indicate a desire to cluster the selected nodes. In some interfaces, this can be done by selecting a button in the toolbar, hitting a particular command key or keystroke combination, or selecting a menu item from a graphically implemented menu structure. At step 330, the user is prompted to select one or more attributes that will be used to perform the cluster. In FIG. 5, multiple nodes have been selected, the cluster command has been given, and the left portion of the screen 500 is displaying the cluster command interface 520. This interface 520 includes a check box list 522 of attributes that may be used for selecting which attributes to use for the clustering method 300. The possible attributes 522 are selected from the profiles data 420 associated with the nodes selected in step 310. The available attributes 522 may include the predefined attributes 131-135, or the custom attributes 136 defined by the user.

Once the user has completed their attribute selection in step 330, the method begins creating the cluster around that attribute (or those attributes if multiple attributes were selected), the next step 340 creates a lightweight "value" node for each unique value present for the selected nodes (step 310) for the selected attribute (step 330). The description of these nodes as "lightweight" or "virtual" indicates that the node exists only locally on the users computer and will not be saved once the page is refreshed. These are temporary nodes that are created and displayed to allow the users to analyze the data in the database 100. These virtual nodes can also be referred to as value nodes, as they are nodes temporarily assigned to particular values for the selected attribute. Each value node is assigned a type attribute that is based on the name of the attribute that generated that value node. Advanced options allow for changing the type that is assigned to a custom value of the user's choosing. At step 350, the method 300 creates lightweight virtual or "value" edges from the nodes included in the clustering selection (from step 310) to the newly created value nodes (step 340) according to the attribute values that the nodes had stored on their profile 130. Each virtual edge is assigned a type attribute that is based on the name of the attribute that generated that virtual edge. Advanced options allow for changing the type that is assigned to a custom value of the user's choosing. In the example, step 340 will create new value nodes for each "Industry" value 422 found in the selected node set, and then step 350 will create an edge connecting that value node to all selected nodes that contain that value in attribute 422. Thus the node for Nassef Sawiris 414 will be connected by a virtual edge 610 to a new value node 620 for the "construction" value (both of which will have a type "Industry" assigned), as shown in FIG. 6.

The value nodes created based on the unique values for "Industry" are lightweight or "virtual" nodes, and will normally disappear if the user refreshes the page or changes the clustering settings. At step 360, however, the user is allowed to save the created nodes (step 340) and edges (step 350) permanently in the database 100, such as by clicking a "Save" button 630. This step is optional, and if selected by the user will effectively turn all of the lightweight nodes and edges created in the clustering method 300 into heavyweight nodes and edges. This means that the nodes and edges are saved both locally and to the server database 300 as stored nodes 110 and edges 120 that will be available in maps created for future users and page refreshes.

Finally, step 370 allows the user to choose to alter the attributes that are used to create the clusters. In FIG. 6, this is allowed by allowing the user to uncheck attributes that are currently active for clustering and check attributes that are desired to be included in the clustering, all completed via a check box list of attributes 640 on the same display screen 600 that shows the virtual nodes and edges created in steps 340 and 350. The method 300 then ends at step 370.

The display of the clusters shown in FIG. 6 can be governed through style sheets that specify decorations and filters for lightweight nodes and edges. Additionally, one embodiment allows for profiles 130 to be predefined that are relevant to lightweight value nodes. In this embodiment, these profiles 130 persist whether or not the related value node is present. These profiles can be built while the clustering operation is active, but before clearing or saving the operation. Once created, the profiles 130 can be reconciled and automatically attached to lightweight nodes when the combination of label (as defined by the value of the attribute that is created through clustering) and type (as defined by the name of the attribute that is used for clustering) for the lightweight node or edge match the label and type of a lightweight profile. This makes it so that additional profile data can be added to a clustered node without ever saving the clusters as heavyweight nodes.

Additionally, one embodiment allows the user to pre-define the attributes to use for clustering and override the type assigned to the virtual nodes using a CSS-like language called perspectives. Each perspective allows for inclusion of a "cluster" declaration that specifies which attributes should be used for clustering. Optionally, a selection of nodes can be targeted for each cluster rule by defining a "selector." Once defined, the clusters will be automatically applied when the perspective is activated. Users can switch perspectives using an interface that lists each perspective as links that can be clicked to activate that perspective (as is explained in more detail below in connection with FIG. 12), or by navigating to a URL that is linked to the given perspective. Optionally, the user can override the default type value assigned to the value node (which defaults to the name of the attribute) by specifying the custom value to be used. Each attribute defined in the "cluster" declaration within perspectives can have it's own custom value defined for the type.

Focus

Figure 7:
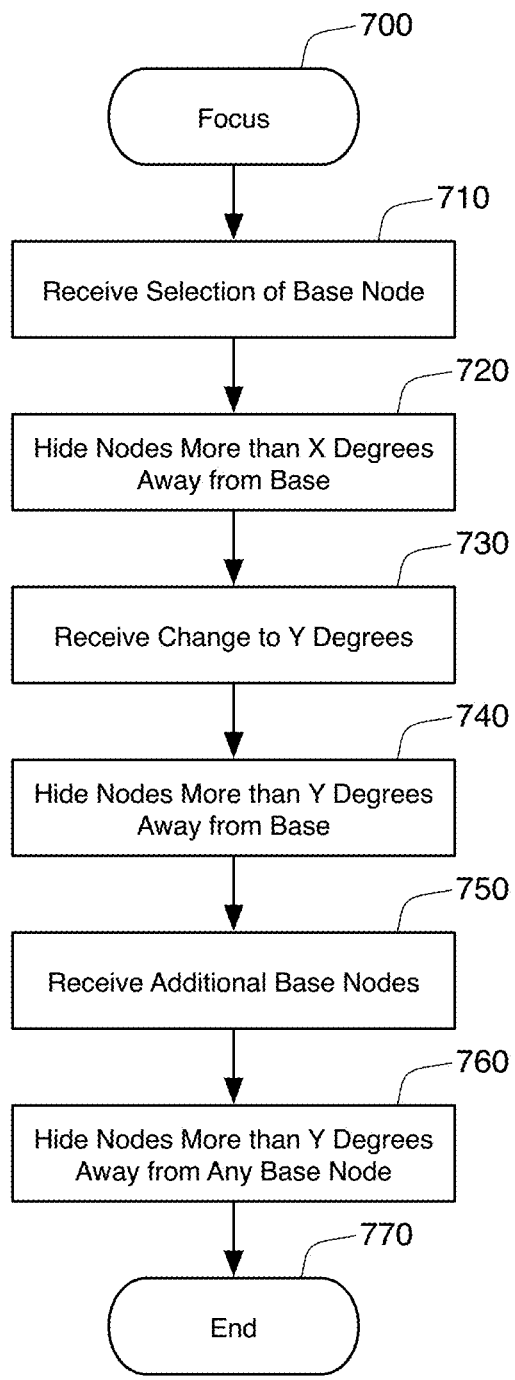
FIG. 7 is a flow cart showing a method for implementing focusing.

Any node 110 that is directly connected to another node 110 by a single edge 120 is considered to be one degree separated from that node 110. If a node 110 is connected through another node 110 to a third node 110 (through two edges 120), those nodes are considered to be separated by two degrees. In one embodiment, the user interface provided by the client computer 160 allows the user to easily focus in on and explore a subset of displayed nodes 110 and edges 120. This method of "focusing" attention on a subset of the nodes 110 is shown in FIG. 7 as focus method 700.

Figure 8:
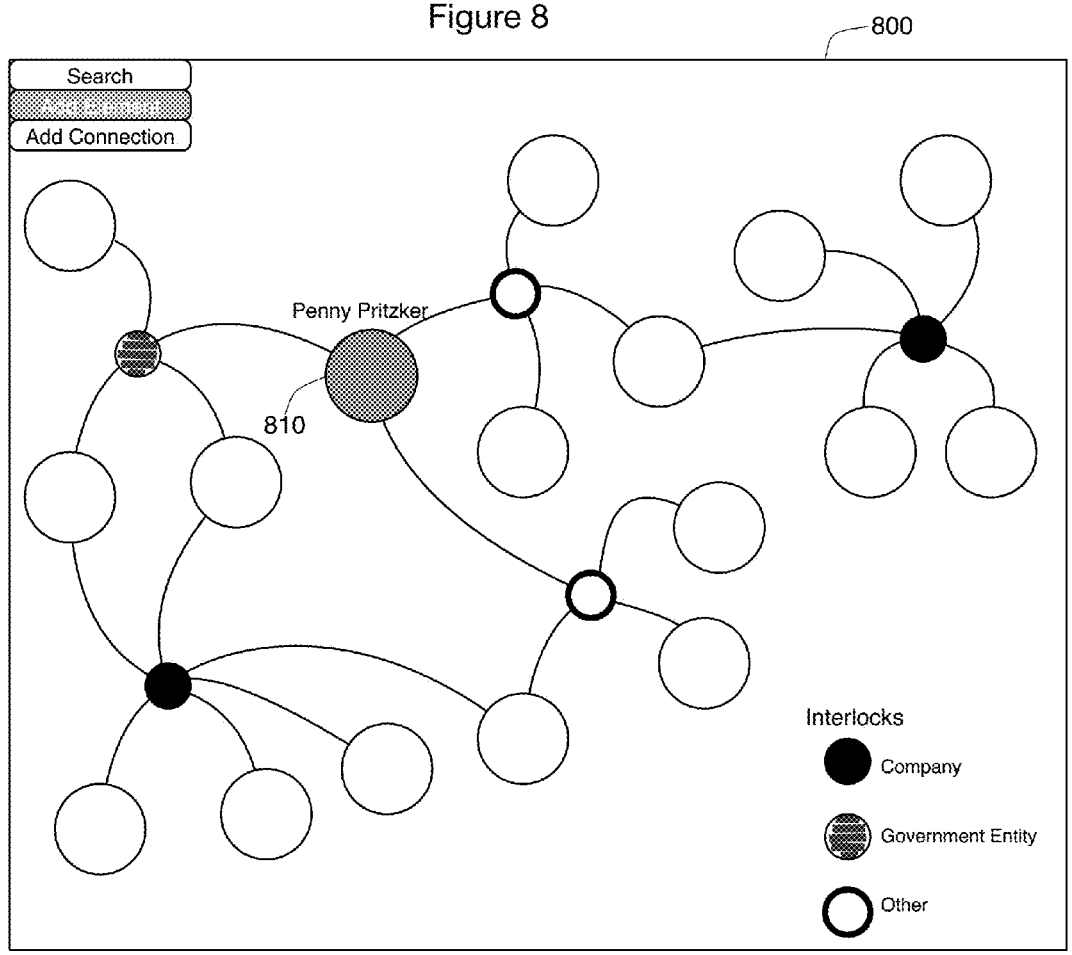
FIG. 8 is a screenshot showing nodes and edges before focusing.

The method 700 begins by a user selecting a base node in step 710 that is to be used for the focus method. FIG. 8 shows a screen 800 that contains an unfocused map of data. If the user wishes to focus in on node 810, they would select that node 810 in step 710 and request the map to create a focus on that node 810. In the preferred embodiment, a node such as node 810 is selected simply by "clicking" on the node. Focus is initiated by "clicking-and-holding" on a node. In interface 800, the user can click-and-hold on node 810, which selects that node 810 as the base node in a focus operation (step 710).

At step 720, the programming that provides the interface hides all nodes in display 800 that are more than N degrees away from the selected base node. The "N" can be predetermined through user preference settings. In the preferred embodiment, the user can quickly change the number of degrees that are used for focusing operations by using particular keystrokes (hitting the number 1 key for 1 degree, the 2 key for 2 degrees, the + key to increment the number of degrees, the − key to decrement, etc.). By default, the system may immediately focus on the node using 1 degree of separation, as shown in screen 900 in FIG. 9. As seen in this figure, base node 810 is shown along with three edges 120 that connect the node 810 to the three nodes 910, 920, 930 that are separated from the base node 810 by one degree of separation. The user can return to the unfocused screen 800 by clicking and holding on the background 940 of the focused map shown in FIG. 9 or through alternative keyboard shortcuts and menus.

If the user changes the number of degrees for the focus (step 740), the programming will change which nodes are hidden based on the newly selected value (step 750). For example, if the user viewing screen 900 changes the number of degrees from 1 to 2, the system would respond with screen 1000 (shown in FIG. 10) which surrounds the base node 810 will all nodes 110 that are within 2 degrees from the base node 810. This includes all of the first-degree nodes 910 shown in screen 900, and also all second-degree nodes 1010 connected to these first degree nodes 910.

Instead of changing the degrees of separation shown in the focus, the user could have selected a second base node for the focus display. This takes place in step 750, which can occur even if the user has not changed the number of degrees to be shown in step 730. If the user viewing screen 900 was concerned only with nodes connected to the "Obama for America" node 910, she could select this 910 as a new base node in step 750. This can be done through menus, command buttons, or simply by clicking-and-holding on this node 910 on display screen 900. This new base node 910 is then a second base node (along with node 810), resulting in focus screen 1100 shown in FIG. 11 (step 760). This screen 1100 shows all nodes that are one degree of separation from either of the two base nodes 810, 920. In the preferred embodiment, focus screens 1000, 1100 are always redrawn to ensure that the base nodes are closer to the center of the screen 1000, 1100. In one embodiment, a center of gravity is calculated for all of the displayed nodes, and the center of gravity is re-centered in the screens 1000, 1100 to achieve an optimal layout.

Figure 9:
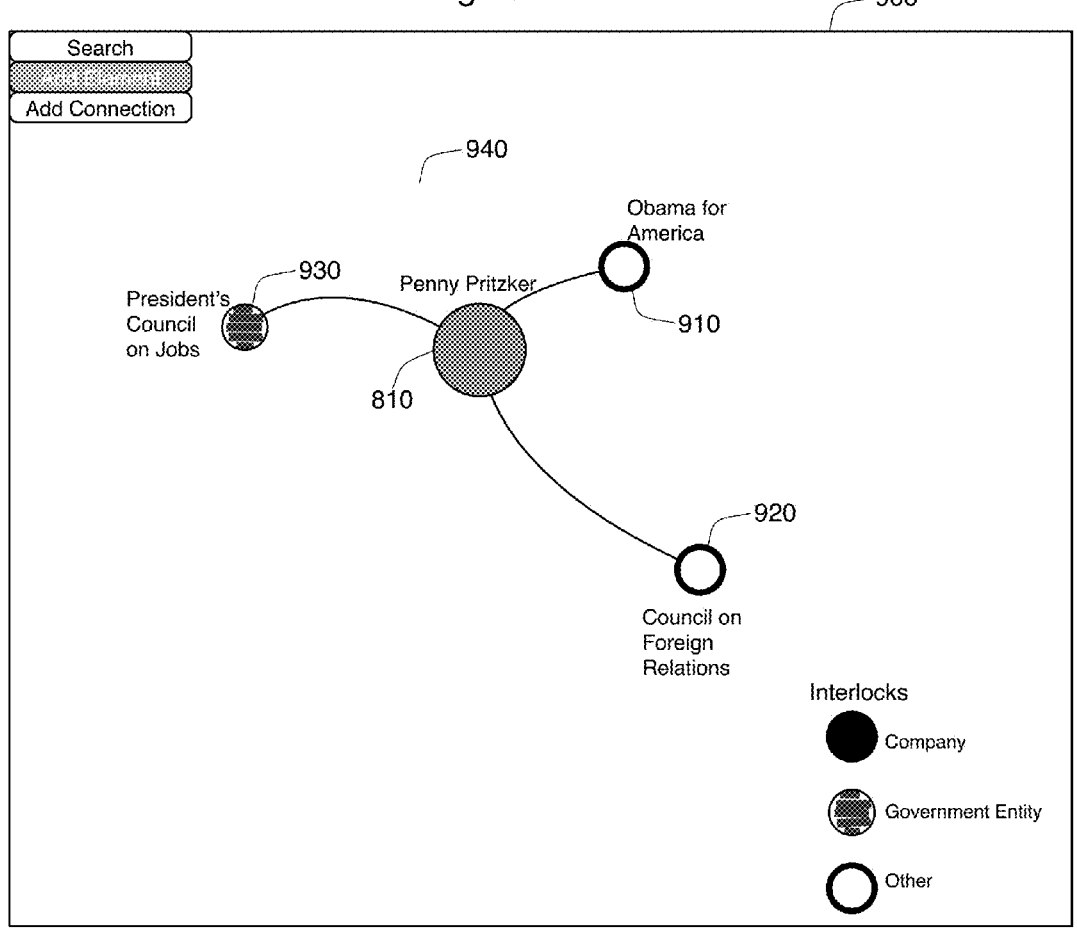
FIG. 9 is a screenshot showing focus on a node.
Figure 10:
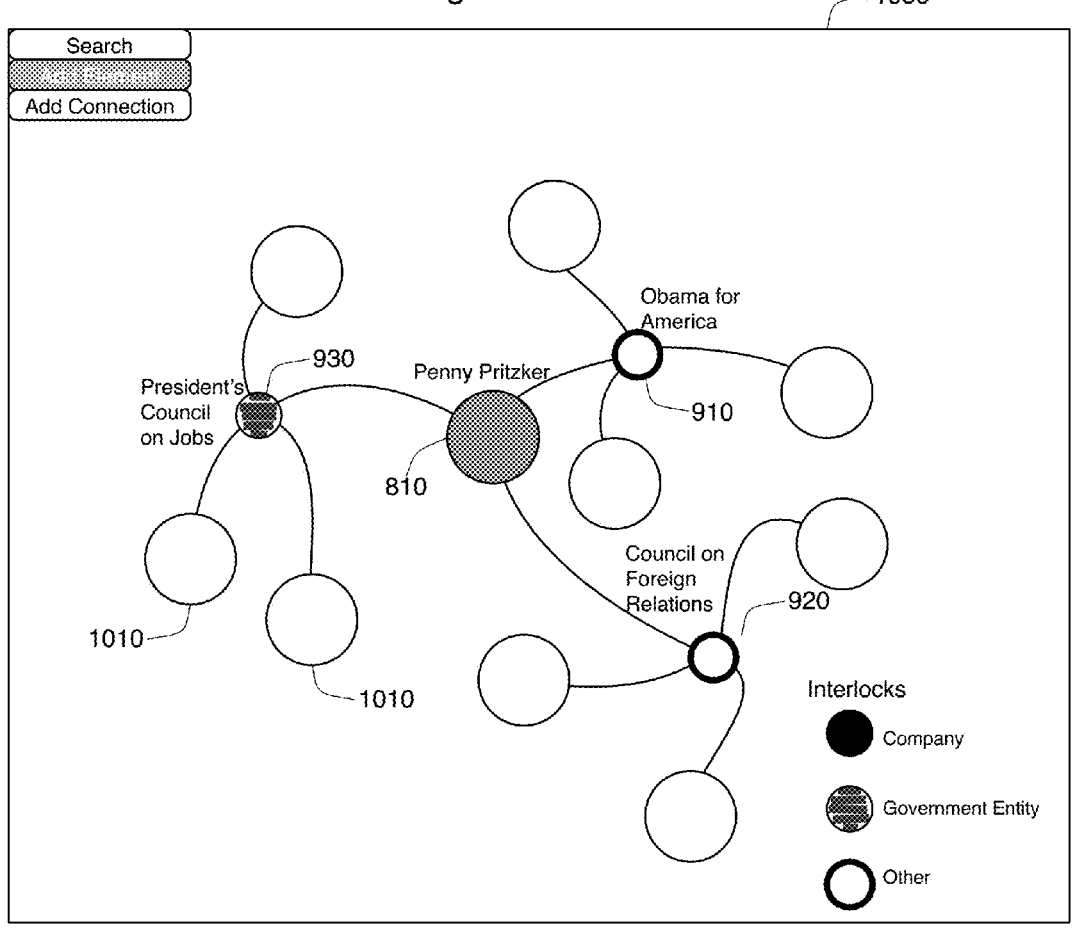
FIG. 10 is a screenshot showing focus with an alternative degree of separation.
Figure 11:
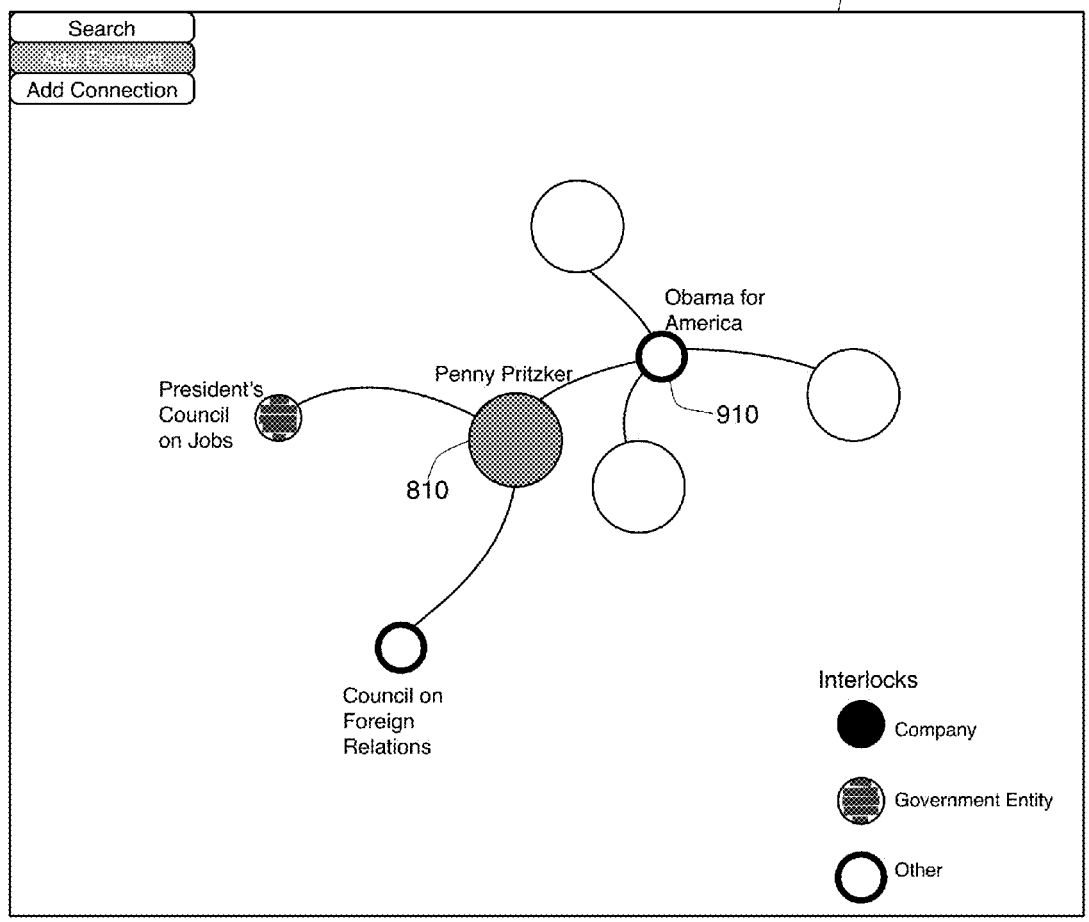
FIG. 11 is a screenshot showing focus on two nodes.
Figure 12:
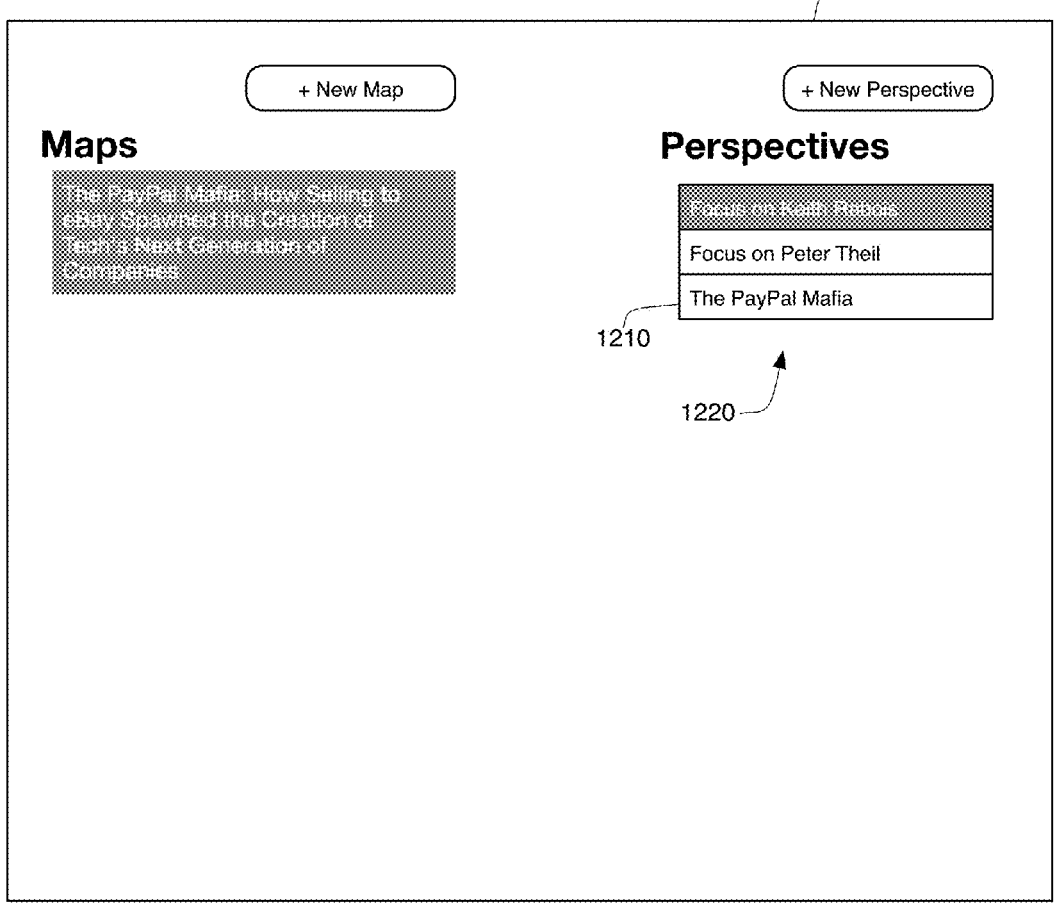
FIG. 12 is a screenshot showing a user interface for selecting among perspectives having different focus options.

Additionally, one embodiment allows the user to pre-define the base nodes and desired degree of separation for each using a CSS-like language called perspectives. Each perspective allows for inclusion of a "focus" declaration that specifies the selector (which defines the selection of base nodes and other graph objects to be included) and the desired degree of separation for that selector. Multiple selectors and desired degrees of separation can be included in the "focus" declaration. This allows for focus settings to be saved and activated automatically based on the activation of the perspective. FIG. 12 shows a screenshot 1200 in which a plurality of perspectives can be presented to a user. The user can select a particular perspective 1210 from an interface 1220 that lists each perspective. The interface 1220 can be implemented as links that can be clicked to activate the chosen perspective, or by navigating to a URL that is linked to the given perspective. Once a perspective 1210 is selected, it will be displayed such as is shown in FIGS. 9, 10, and 11. When a perspective 1210 with a defined focus is being displayed, a user can escape from that focus by clicking and holding on the background 940 of the map or using alternative keyboard shortcuts and menus. The defined focus will be re-applied the next time the user refreshes the browser or selects the focus from the interface 1220.

Perspectives

The preferred embodiment uses a style sheet-type language (similar to cascading style sheets or CSS used in website design) to define the visual appearance and behavior of the graph data. The use of this language is referred to as "perspectives." Perspectives allow users to query the database and use those queries to change the visual properties of the nodes, edges, and other graph objects and also affect the behavior and visibility of the graph and its contents. The language separates design from content and assigns appearance and behavior in a displayed graph based on the properties of the detached profile associated with each displayed node 110, edge 120, loop 122, or other graph entity 124, 126.

The use of this language also provides the ability to transform the network through an unlimited number of transform operations, including filtering, focusing, bridging, collapsing, and confirming. Available transform operations include:

Filtering: The ability to hide nodes, edges, and other graph objects based on attribute values found in the profiles.

Focusing: As described above, focusing provides an ability to display a subset of the map based on one or more base nodes and a specified number of degrees out.

Bridging: The ability to collapse a longer path into a shorter path. For example, if the original path was Node A->Node B->Node C, bridging on Node B collapses this path to Node A->Node C.

Collapsing: The ability to join a group of related nodes into a single node that maintains references to the individual nodes and inherits the edges of all joined nodes. For example, a more detailed view may include each person that works at an organization and have edges directly from the person to other contacts. Collapsing to a higher-level community would include joining all of the people at an organization into a single node that inherited all of the edges of those people that were included.

Confirming: The ability to identify whether two nodes (Node A and Node B) are connected in both directions (Node A->Node B and Node B->Node A). In the preferred embodiment, edges 120 that connect nodes 110 can be directional (one direction), mutual (both directions), or undirected. If the two nodes are connected in both directions, the ability to hide one edge and draw a single line between the two nodes representing a confirmed edge. If the two nodes are not connected in both directions, the ability to hide the single edge between the nodes.

The perspectives language is CSS-like in that it shares similar properties and is written similarly to CSS, but is designed specifically for graphs. Instead of selecting HTML elements, the perspectives language deals with the contents of graphs. The language can be applied to nodes 110, edges 120, loops 122 and other graph objects. While traditional CSS style sheets apply only to DOM-based HTML elements (such as SVG), perspectives make it possible to apply styles to any graph representation (such as Canvas or OpenGL for example). Perspectives also support graph traversals and queries. The language is written in a text-based format that allows for easy editing, collaboration, transfer, and storage. While unique in its ability to apply to a non-DOM based graph representation, it can also be applied to DOM-based graphs.

Perspectives also allow for assigning of styles to virtual nodes and edges, including the pre-definition of styles for virtual nodes and edges that don't exist yet (as described above in connection with clustering). An unlimited number of perspectives can be created, perspectives can apply to multiple maps, and they can be easily duplicated and shared.

Perspectives are written in a text-based format that includes a collection of selector and property combinations. Selectors provide a method of selecting nodes, edges, and other graph objects based on the data stored in the profile and other system assigned IDs. Properties are based on standard CSS properties and values wherever possible, straying where conventional values were irrelevant or misleading (e.g. display: map vs. display: block), and adding properties specific to the preferred embodiment (such as bullseye-color). The general format is shown in Table 1:

TABLE 1

```
selector {
    property: value;
    property: value;
}
```

Part 1: Selectors

Selectors define which graph objects will be governed by the statement. Type selectors come in three flavors: universal, general and specific. A universal selector matches all nodes, edges, and loops. In the preferred embodiment, an asterisk ('*') is used for the universal selector. A general selector refers to nodes, edges, or loops as 'element', 'connection', or 'loop' respectively, and matches all such items within the given collection. Specific type selectors are based on the assigned type. Each node 100, for instance, contains a type 132 attribute in its associated profile 130. Specific type selectors match graphic entities with the identified type. A node 110 with type 132 of "Person" would be selected using 'person' selector. An edge 120 with type 132 of "Personal" would be selected using 'personal-connection.'

ID selectors come in three flavors: informal, assigned, and system. Informal ids are just the slugged version of the "label" attribute 131. In most cases informal ids will be unique, meaning that no two nodes 110 or edges 120 will use the same label 131 or informal id. Informal IDs are also usually unchanging and have the added benefit of being naturally descriptive. An informal ID may look like "#nassef-sawiris". Assigned ids are ids that are directly assigned by a user for use solely as an ID (not as a label 131). Assigned IDs are stored in the profile 130 like the label 131, and can be used if the label attributes 131 change over time or are not unique. Although users are allowed to create and assign their own assigned IDs, the preferred embodiment requires that every assigned ID be unique. System ids are ids that are assigned automatically by the programming 144, 164 that is providing access to the database 100, and might look like "#loop-123". System IDs are guaranteed to be unique and permanent, making them an excellent choice for permalink-style references. All system IDs are prefixed with the collection identifier, followed by a unique random identifier.

Tag selectors examine the tags 135 to determine which graphic items 110, 120, 122, 124, and 126 are selected. Tags selectors are created by placing a period in front of a tag. The ".influential" tag selector would match all items that have been tagged "Influential."

Attribute selectors match all items with the given attribute condition. Attribute selectors can take a variety of forms. For instance, it is possible to have the selector select items that have any value assigned for an entity, which is known as a presence attribute selector. In the preferred embodiment, presence attribute selectors are created by placing square brackets around the attribute label; such as "[description]" which would select all items where a value has been assigned to the Description attribute 133. It is also possible to denote the absence of any value being assigned an attribute, which in the preferred embodiment is accomplished by adding an exclamation mark to the attribute label inside the brackets "[!description]".

Attribute selectors also allow comparisons and searches for data within a particular attribute. For example, the preferred embodiment has the ability to search for values within an attribute in a variety of ways: starts with: [label ^=value], ends with: [label $=value], matches: [label *=value], and includes: [label ~=value]. Note that the "includes" operator '~=' is only relevant for attributes with multiple values, such as tags 135 or a custom skills attribute 136. Similarly, numerical values can be analyzed, such as less than: [label <10], greater than: [label >10], less than or equal to: [label <=10], and greater than or equal to: [label >=10].

Selectors can be combined in either "AND" or "OR" fashion. To combine with "AND", place two selectors next to each other without spaces: 'node.influental'. To combine with "OR", place two selectors next to each other with a comma in between: 'node, .influential'.

Selectors also provide traversal operations, allowing graphs to be queried by relationships. Traversal selectors select nodes 110 based on the edges 120 that connect the nodes 110. Table 2 shows the available traversal selectors.

TABLE 2

```
a b    -- select all b's connected to a's (any distance or direction)
a ~ b  -- alias, same as above (can be qualified)
a + b  -- select all b's adjacent to a's (any direction)
a > b  -- select all b's within one degree from a's
a < b  -- select all b's within one degree to a's
a ~> b -- select all b's reachable from a's (any distance)
a <~ b -- select all b's that can reach a's (any distance)
```

Traversal operators can be stacked for precise control of the relationship distance. Thus, while "a+b" selects all b's within one degree of a's, "a+++b" select all b's within two degrees of a's (any direction). Similarly, "a >>>b" select all b's within three degrees from a's.

Traversal operators can also be qualified, allowing traversable edges 120 to be filtered by an additional type 132 selector for the edge 120. Since traversal qualifiers only select edges, the standard-connection suffix is not required when identifying the type 132. Traversal qualifiers immediately follow the traversal operator. For example, "a >likes b" selects all b's liked by a's (linked in the correct direction by an edge 120 having a type of "like"), and "a<likes b" selects all b's that like a's." Using standard natural language parsing, it is possible to define traversal selectors in a more natural language, such as "employers of my friends who live in New York". As explained above, multiple types of connectors can be used to specify a very specific selector, such as "#me >friend person[location=NY]+employer" which is parsed to mean any employer who is connected to elements with type "person" who have an edge with a value of "friend" connected to a node with label "me", and who also have a location attribute with value "NY".

Pseudo-selectors are also provided to perform common traversal operations. Thus, "<selector>:nodes" identifies related nodes from the selector, "<selector>:edges" collects the related edges from the selector, and "<selector>:out(3)" collects three degrees out from the selector.

An "@settings" selector is also used to define map-wide properties, which are covered in detail in Part 2.

Part 2: Properties

Once the graphic elements are selected using one or more selectors, the properties are used to change the display (decorations) and behavior of those elements. The preferred embodiment supports a number of properties, all of which have unit-less values. These properties include: arrow-color, arrow-visibility, border-color, border-width, bullseye-visibility, bullseye-size, bullseye-color, bullseye-opacity, color, curvature, delay-visibility, display, visibility, font-family, font-size, font-style, font-weight, image-url, image-size, image-visibility, label-visibility, length, margin, opacity, padding, size, scale, shadow-visibility, shadow-size, shadow-color, shadow-opacity, strength, style and text-align.

In addition to the above properties, the preferred embodiment also supports a handful of properties specific to the general '@settings' selector. These include: focus, cluster, theme, layout, quality, font-size, font-family, background-color, layout-cooling, layout-friction, layout-damping, layout-convergence, layout-theta, layout-max-force, layout-min-velocity, layout-gravity, layout-particle-charge, layout-spring-length, layout-spring-strength, and layout-spring-constant. Focus allows for the advance definition of the base nodes and how many degrees out for each base node. Cluster allows for the advance definition of the attributes to use for clustering and optionally a custom type value to assign to the virtual nodes created through clustering. Theme allows the user to choose a template that automatically includes @settings values and decorations relevant to the selected template. Quality provides the ability to be able to shift between two optimized modes of visualization, one that renders using circles, images when available, and curved lines, the other which renders using squares, straight lines, and other techniques to make the visual rendering less processor intensive and thus work faster for larger graphs. All the properties that begin with "layout-" allow for modification of the settings value for controlling the physics based layout used for floating elements in Kumu.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A computer implemented method of graphically displaying data, comprising:
   a) accessing, at a computer, graph data comprising
      i) a plurality of nodes,
      ii) a plurality of edges, each edge establishing a relationship between two nodes,
      iii) a plurality of data profiles, each profile containing attribute-value pairs associated with at least one of a node and an edge;
   b) identifying, at the computer, a first cluster definition, the cluster definition comprising a selection of a set of nodes and an identification of a selected attribute;
   c) identifying, at the computer, unique values for the selected attribute in the data profiles associated with the set of nodes;
   d) establishing, at the computer, a plurality of value nodes, with each value node being associated with a different value in the identified unique values of the selected attribute;
   e) establishing, at the computer, a plurality of value edges that establish a relationship between each value node and the nodes in the set of nodes that have values for the selected attribute that is the same as the value associated with the value node; and
   f) presenting, through computerized user interface, a map showing the set of nodes, the plurality of value nodes, and the plurality of value edges shown linking the value nodes to the set of nodes.

2. The computer implemented method of claim 1, further comprising display style rules for the set of nodes, value nodes, and value edges, further wherein the presenting step presents the map showing the set of nodes, the plurality of value nodes, and the plurality of value edges according to the display style rules.

3. The computer implemented method of claim 1 further comprising storing a plurality of cluster definitions, wherein the step of receiving the first cluster definition further comprises presenting a list of the plurality of cluster definitions through the computerized user interface and receiving a selection of the first cluster definition through the computerized user interface.

4. The computer implemented method of claim 1, wherein the step of identifying the first cluster definition further comprises:
   i) receiving, through a computerized user interface, a selection of a set of nodes,
   ii) presenting, through the computerized user interface, a list of attributes for the set of nodes, and
   iii) receiving, through the computerized user interface, an identification of a selected attribute from the list of attributes.

5. The computerized method of claim 4, wherein the list of attributes consists solely of attributes having assigned data in the data profiles associated with nodes in the set of nodes.

6. The computerized method of claim 4, wherein the graph data is stored in a database.

7. The computerized method of claim 6, wherein the database is accessed by a server computer, and further wherein the computerized user interface is presented by a client computer that communicates with the server computer over a computerized network.

8. The computerized method of claim 7, wherein the value nodes and value edges are maintained by the local computer in a local store and are not stored in the database by the server computer.

9. The computerized method of claim 7, wherein the value nodes and value edges are stored in the database by the server computer.

10. The computerized method of claim 4, wherein the set of target nodes comprises all nodes in the graph data.

11. The computerized method of claim 4, wherein the set of target nodes comprises a subset of less than all nodes in the graph data.

12. The computerized method of claim 4, wherein a first and a second attribute are identified, further wherein value nodes and value edges are created for both the first and second attributes and are presented in the map through the computerized user interface.

13. The computerized method of claim 4, further comprising:
   g) while presenting the map, also presenting an interface element to select a replacement attribute, wherein receipt of a replacement attribute through the interface elements causes the establishment of new value nodes and value edges based on the replacement attribute, further wherein the new value nodes and new value edges are then presented through the computerized user interface connected to the set of nodes in a revised map and the previous virtual nodes and virtual edges are hidden from the map and removed from local storage.

* * * * *